US006944136B2

(12) United States Patent
Kim et al.

(10) Patent No.: US 6,944,136 B2
(45) Date of Patent: Sep. 13, 2005

(54) TWO-WAY AUDIO/VIDEO CONFERENCING SYSTEM

(75) Inventors: Myong Gi Kim, Long Grove, IL (US); Arthur Yerkes, Chicago, IL (US)

(73) Assignee: On-Demand Technologies, Inc., Chicago, IL (US)

( * ) Notice: Subject to any disclaimer, the term of this patent is extended or adjusted under 35 U.S.C. 154(b) by 0 days.

(21) Appl. No.: 10/758,883

(22) Filed: Jan. 16, 2004

(65) Prior Publication Data

US 2004/0172656 A1 Sep. 2, 2004

Related U.S. Application Data

(63) Continuation-in-part of application No. 10/376,866, filed on Feb. 28, 2003.

(51) Int. Cl.[7] .......................... H04L 12/16; H04N 7/14; G06F 15/16
(52) U.S. Cl. .................... 370/260; 370/352; 348/14.08; 709/204
(58) Field of Search ................................ 370/259–263, 370/351–356, 400–402, 338, 392, 379; 379/202.01, 207.01; 348/14.01–14.09; 709/230–237, 204

(56) References Cited

U.S. PATENT DOCUMENTS

| | | | | |
|---|---|---|---|---|
| 6,081,513 A | * | 6/2000 | Roy ............................ 370/260 |
| 6,122,665 A | * | 9/2000 | Bar et al. .................... 709/224 |
| 6,201,562 B1 | * | 3/2001 | Lor .......................... 348/14.01 |
| 6,288,739 B1 | * | 9/2001 | Hales et al. ............. 348/14.07 |
| 6,646,674 B1 | * | 11/2003 | Kato ........................ 348/14.13 |
| 6,731,734 B1 | * | 5/2004 | Shaffer et al. .......... 379/202.01 |
| 6,760,772 B2 | * | 7/2004 | Zou et al. .................... 709/230 |
| 6,788,660 B1 | * | 9/2004 | Agrawal et al. ............ 370/331 |
| 2001/0032270 A1 | * | 10/2001 | Koo ............................ 709/237 |
| 2001/0043571 A1 | * | 11/2001 | Jang et al. .................. 370/260 |
| 2002/0071434 A1 | * | 6/2002 | Furukawa ................... 370/392 |
| 2004/0119814 A1 | * | 6/2004 | Clisham et al. .......... 348/14.08 |

* cited by examiner

*Primary Examiner*—Steven Nguyen
(74) *Attorney, Agent, or Firm*—Welsh & Katz, Ltd.

(57) ABSTRACT

A method and apparatus are provided for exchanging audio/visual information between a caller and a called party through the Internet. The method includes the steps of setting up a session link between the caller and called party using a tunneled real time control protocol and collecting audio and video information from the caller and called party. The method further includes the steps of forming the audio and video portions into data objects, attaching a time stamp to each formed data object and exchanging the formed audio and video data objects as real time packets using a transport control protocol between the caller and called party through the session link.

16 Claims, 15 Drawing Sheets

TWO-WAY AUDIO/VIDEO CONFERENCING SYSTEM

BACKGROUND OF THE INVENTION

The field of the invention relates to Internet communication and the near-instantaneous delivery and playback of digitally encoded audio and video. Internet broadcasting or web casting allows many people to listen to radio stations or to view news programs over the internet. However, internet broadcasting or web casting has an average latency of 5–20 seconds. That is, from the time the internet radio station starts the music or talk radio program, listeners will actually hear it 5–20 seconds later. The source of this latency comes from, for example, encoding, internet transport (distribution), and decoding.

While this kind of latency may be acceptable for some applications (e.g. listening to music, talk shows and any pre-recorded program may be acceptable), there are time-critical applications for which a 5–20 second delay is unacceptable. For example, real-time market updates, emergency broadcasts (fire, natural or manmade disasters), military, police or 911 dispatches may not be able to tolerate such a delay.

One obstacle to internet broadcasting is the high cost of the encoding station, both for hardware and software. The complexity associated with setting up the encoding station, as well as the required maintenance makes it even more difficult to establish and operate such an encoding station. Another obstacle is the lack of a standard in audio, as well as, video players. Presently, there are three major media players, Microsoft's Windows Media™, RealNetworks's Real One™ and Apple's QuickTime Media Player™, that can play back digital multimedia streams. Each of these players requires different ways of broadcasting over the internet. The variety of network protocols, routing methods and security rules governing the usage of the internet also make internet broadcasting difficult.

One method of broadcasting over the internet is termed streaming. Microsoft®, RealNetworks®, and Apple® Computer are the three largest companies offering streaming products. However, streams from each of their systems are generally incompatible with one another. Streams encoded by Microsoft's Windows Media™ Server only work with Windows Media Player or Real One player, those encoded by RealNetworks' Real Server™ can only be played by RealPlayer™, while those encoded by Apple's QuickTime only work with the QuickTime Media Player™ or Real One player.

At nearly the same time the Microsoft, RealNetworks and Apple Computer developed their proprietary streaming systems, the Motion Pictures Experts Group (MPEG), a trade organization concerned with setting broadcast standards for the motion picture industry, released the MPEG-1 standard for encoding and compressing digital audio and video. A subset of this specification, MPEG-1 layer 3 audio (commonly referred to as MP3), quickly became the most popular compressed digital audio format because of its superior compression ratios and audio fidelity. Further contributing to the popularity of the MP3 format was the widespread availability of inexpensive (and in many cases, free) authoring and playback tools made possible by the presence of an open, published standard. Driven by overwhelming public support for the MP3 format, many such media players, including RealPlayer, Windows Media Player, and QuickTime, quickly added support for the MP3 standard.

Seizing on the popularity of the MP3 audio format, On-Demand Technologies™ ("ODT") developed the AudioEdge™ server, which simultaneously serves a single MP3 audio stream to all major players. Prior to AudioEdge™, broadcasters wishing to stream to their widest possible audience were required to encode and serve streams using multiple proprietary platforms. With AudioEdge™, one MP3 encoder and one serving platform reach all popular players. In this manner, AudioEdge™ saves bandwidth, hardware, and maintenance costs. Additionally, because AudioEdge™ supports Windows Media (the most popular proprietary streaming media format) and MP3 (the most popular standard based streaming media format) streams, the AudioEdge™ system eliminates the risk of technology lock-in, which is associated with many proprietary platforms.

Multimedia streaming is defined as the real-time delivery and playback of digitally encoded audio and/or video. The advantages of streaming compared to alternative methods of distributing multimedia content over the internet are widely documented, among the most important of which is the ability for immediate playback instead of waiting for the complete multimedia file to be downloaded.

Two types of streaming are common today on the internet: on-demand and live. ODT AudioEdge™ delivers both live and on-demand (archived file) streams encoded in MP3 or Windows Media (WMA) format, and can be played using the major media players. Additionally, AudioEdge™ is capable of delivering both archived Apple QuickTime and RealNetworks encoded media files on-demand.

On-demand streaming delivers a prerecorded (e.g., an archived) multimedia file for playback by a single user upon request. For on-demand streaming, an archived file must be present for each user to select and view. An example of on-demand streaming would be a television station that saves each news broadcast into an archived file and makes this archived file available for streaming at a later time. Interested users would then be able to listen to and/or view this archived broadcast when it is so desired.

Live streaming involves the distribution of digitized multimedia information by one or more users as it occurs in real-time. In the above example, the same news station could augment its prerecorded archived content with live streaming, thus offering its audience the ability to watch live news broadcasts as they occur.

Live streaming involves four processes: (1) encoding, (2) splitting, (3) serving, and (4) decoding/playback. For successful live streaming, all processes must occur in real-time. Encoding involves turning the live broadcast signal into compressed digital data suitable for streaming. Splitting, an optional step, involves reproducing the original source stream for distribution to servers or other splitters. The splitting or reflecting process is typically used during the live streaming of internet broadcasts (webcasts) to many users when scalability is important.

Serving refers to the delivery of a live stream to users who wish to receive it. Often, serving and splitting functions can occur simultaneously from a single serving device. Last, decoding is the process of decompressing the encoded stream so that it can be heard and/or viewed by an end user. The decoding and playback process is typically handled by player software such as RealNetwork's Real One Player, Microsoft's Windows Media Player, or Apple's QuickTime player. All further uses of the term "streaming" refer to live streaming over the internet, and further uses of the term "server" refer to a device capable of serving and splitting live streams.

As noted earlier, three major software players are available, however, they are not compatible with each other. In other words, a proprietary RealNetworks-encoded audio stream can only be served by a RealNetworks server and played with the RealNetworks Real One Player. RealNetwork claims that their new Real One player, made available in late 2002, can play back Windows Media streams as well as Apple QuickTime's MPEG-4 format. However, in all practicality, the broadcaster would have to choose one of the three proprietary streaming formats, knowing that certain listeners will be excluded from hearing and/or viewing the stream, or simultaneously encode and stream in all three formats.

Unfortunately, existing streaming audio and/or video technologies, although termed live, still exhibit a time delay from when an audio or video signal, is encoded to when the encoded signal is decoded to produce an audio or video output signal. For person-to-person conversation, for example, this delay of as much as 20 seconds is simply unacceptable.

In general, the internet broadcasting of video and audio introduces an average latency of 5–20 seconds. That is, from the time live video and audio frames are being captured, to the time viewers can actually hear and view the frames, is about 5–20 seconds. The sources of this latency for audio and video are similar, and are generally a result of encoding (e.g., video/audio capture and compression of data), delivery (e.g., splitting, serving and transport over IP), and decoding (e.g., buffering, data decompression and play back).

Thus, there exists a need for an improved system for sending and receiving audio and video over a network, such as the internet, with minimal delay. Such a minimal delay may be one that is not perceptible to a user. Such minimal delay may also be referred to as "real-time", "no delay" or "zero delay".

BRIEF SUMMARY OF THE INVENTION

To overcome the obstacles of known streaming systems, there is provided a method and apparatus for exchanging audio/visual information between a caller and a called party through the Internet. The method includes the steps of setting up a session link between the caller and called party using a tunneled transmission control protocol and collecting audio and video information from the caller and called party. The method further includes the steps of forming the audio and video portions into data objects, attaching a time stamp to each formed data object and exchanging the formed audio and video data objects as real time packets using a transport control protocol between the caller and called party through the session link.

BRIEF DESCRIPTION OF THE SEVERAL VIEWS OF THE DRAWINGS

The features of the present invention, which are believed to be novel, are set forth with particularity in the appended claims. The invention may best be understood by reference to the following description taken in conjunction with the accompanying drawings. In the several figures like reference numerals identify like elements.

DETAILED DESCRIPTION OF THE INVENTION

Figure 1:
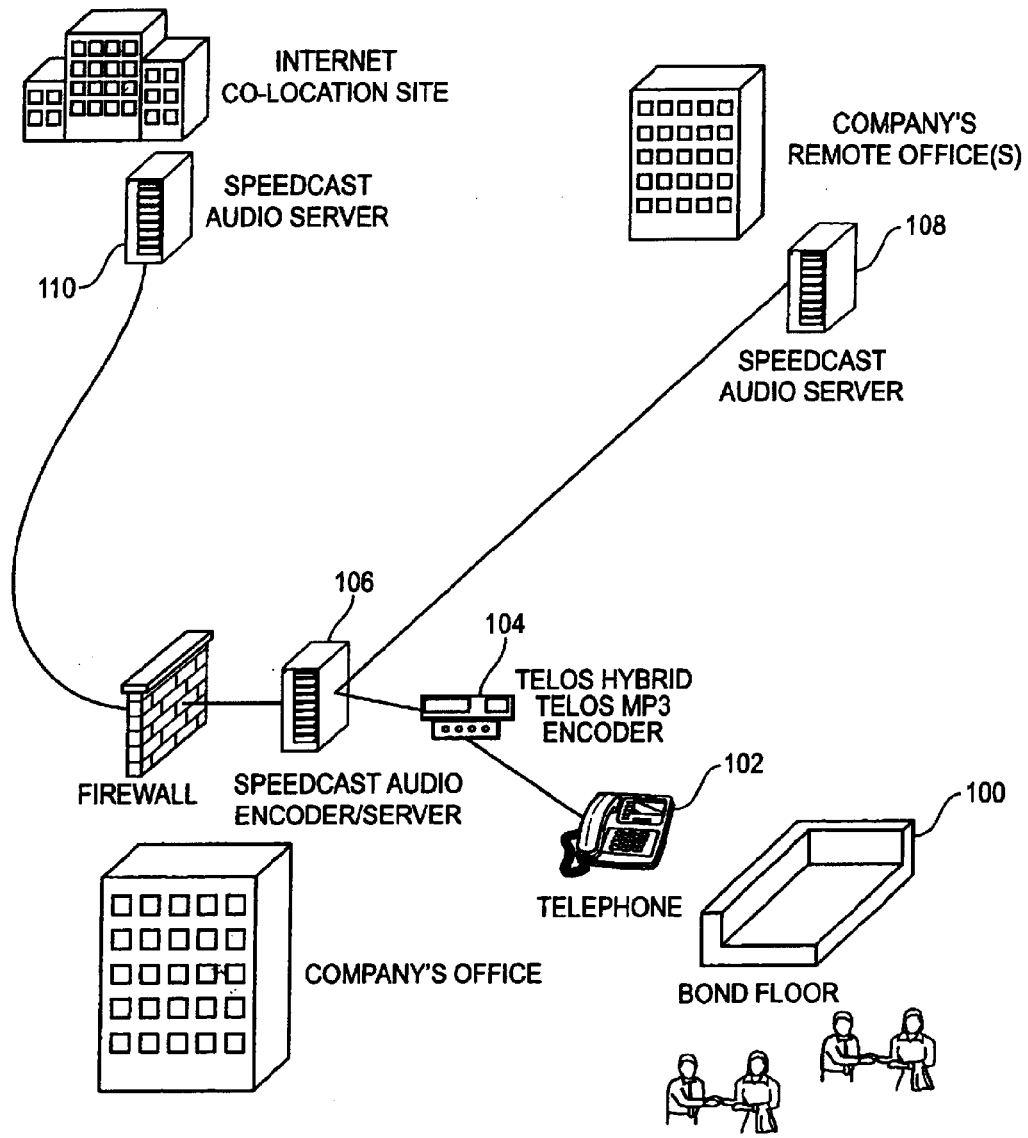
FIG. 1 is a block diagram of an example of a digital audio streaming system.

While the present invention is susceptible of embodiments in various forms, there is shown in the drawings and will hereinafter be described some exemplary and non-limiting embodiments, with the understanding that the present disclosure is to be considered an exemplification of the invention and is not intended to limit the invention to the specific embodiments illustrated.

It should be further understood that the title of this section of this specification, namely, "Detailed Description Of The Invention", relates to a requirement of the United States Patent Office, and does not imply, nor should be inferred to limit the subject matter disclosed herein.

The internet, as used herein, includes the world wide web (web) and other systems for storing and retrieving information using the internet. To view a web site, a user typically points to a web address, referred to as a uniform resource locator (URL), associated with the web site.

At least one embodiment of the system provides a method by which thousands of users can listen to an audio stream simultaneously and economically with very little delay. The typical latency may be 500 ms within the pubic internet. Also, by connecting the encoding station with a generic telephone line, an audio stream may be broadcast from any wired or wireless phones. Other embodiments may not require special hardware or media players. Any internet ready Windows-based computer with a standard sound card and speaker allows users to listen to the broadcasted audio stream.

The present audio system provides faster voice broadcasting over IP than prior art systems using at least an encoder, a server and a player. Various reasons for this improvement have been observed.

For example, one reason is auto-negotiation of the internet transport layer. Depending on the network configuration between the server and player, the audio broadcast can be accomplished via one of the 3 methods: multicast, unicast user datagram protocol (UDP), and tunneled real-time transport protocol (RTP). If the network configuration for the player (client) is capable of accepting multicast packets, the server will transmit multicast packets. If not, unicast UDP or tunneled RTP transport methods will be used. Multicasting is a preferred method over unicast UDP or tunneled RTP because it uses less bandwidth than unicast, and will have less latency than tunneled RTP. Regardless of the network protocols chosen, each audio packet is time-stamped in every 20 ms frame. This time-stamp is used later to reconstruct the packets.

Next, are client and server buffering techniques which typically maintain a dynamically sized buffer that responds to network and central processing unit (CPU) conditions. In general, these buffers are kept as small as possible, because this reduces the time between the voice sample being encoded, and the transmitted voice sample being decoded. Each voice sample may be transmitted every 20 ms, and the system may hold a minimum of one sample and a maximum of 50 samples. The current setting is designed for the worst case latency of one second. Usually this dynamic buffer will hold no more than 10 samples.

The third reason is the choice of audio encoding. The audio system may be tuned to operate at peak efficiency when delivering a broadcast of the human voice. Parameters taken into account when choosing the audio encoding mechanism for the system may include, for example, high compression ratio for encoding while preserving audio quality; data stream ability to be multiplexed; avoidance of forward or backward temporal dependency in encoding (e.g., that is, the data packets produced must be represented as independent blocks which represent a certain slice of time of the original recording delta, and most of the waveform represented by that block may be recovered without reference to adjacent packets, some of which may be lost); and encoding and decoding need not require the top of the line CPUs for their respective computers. Preferably, however, the encoding station is at least a 1.5 GHz Intel CPU or the equivalent, and the decoding station is at least a 500 MHz Intel CPU to run the player.

For clear voice quality the global system for mobile communications (GSM) code was chosen for the audio system designed for human voice. This code filters out background noise from the surrounding environment. Since the psycho-acoustic model is specially tuned for human voice processing, the types of errors in the audio will be limited to errors that sound more natural to human speakers (e.g., switching the "F" sound with the "TH" sound). The usual static or "garbled robot-like voice" typical in direct analog (non-psycho-acoustic) or digital reproductions are unlikely to happen.

For low bandwidth per stream, each audio stream is set for 13 kbits/sec (kbps). Many streaming radio stations use between 24 and 128 kbps. The tradeoff is that generic streaming radio may carry a wide variety of audio types (e.g., rock, jazz, classic and voice) while the audio system is specifically tuned to human voice reproduction. Grouping GSM packets into UDP packets further saves bandwidth.

For secure communication, log-in and data encryption and user authentication may be implemented in the speech broadcasting system.

User and data encryption can be performed using the industry-standard SSL (Secure Socket Layer). The algorithm used may be changed on a per-socket basis, and by the "amount" of encryption (number of bits used in keys). Using SSL also allows the system to interface with a common web browser, making different types of media applications easy. For example, the same server may serve both real-time live streaming media and pre-recorded (archived or on-demand) media files. Their usage may be accurately accounted for by a user authentication system. Accounting coupled with authentication gives the operator of the system an easy way to facilitate billing.

User authentication can be layered on top of the encryption layer and is independent of the encryption layer. This form of authentication performs secure authentication, without exposing the system to potential forgery or circumvention. This permits the use of any method to store user names and passwords (e.g., UNIX password file, htaccess database, extensible markup language (XML) document, traditional database and flat file).

The client software can run on Windows 2000 and XP as MS ActiveX controls, compatible with MS Internet Explorer (IE). The server supports multicast for most efficient bandwidth utilization within intranets. It also supports unicast for most commonly used transport over current IPV4 networks. For those users that are protected by tight firewalls, tunneled hyper text transfer protocol (HTTP) transport may be used.

The system is easy to use for those listening to audio streams. All that is required is a web browser, such as Internet Explorer, that can instantiate ActiveX controls. Once the user visits the appropriate web site, the program is downloaded, installs itself, fetches its configuration files, and attempts to start the most efficient stream type. If the player detects problem(s), it tries an alternative transport type and/or a different code. It does so in the order of preference until a stream with desirable transport (e.g. multicast, unicast and tunneled HTTP) is established at an appropriate bandwidth. As such, the end user does not have to configure the player to circumvent any firewall restrictions that may be in place.

In one embodiment of the system, the audio encoding station contains elements necessary for listening to many audio broadcasts. It can also have the following software: Linux RedHat 7.x; Apache web server; GSM encoder; auto-answering modem software; audio streaming server; and Streaming Server Administrator (SSA)—Java program used to set up and administer audio system. In this embodiment, the audio encoding station can be bundled with an audio streaming server. This server can be, for example, a Linux-based internet "appliance" equipped with GSM encoder, voice capture modem (or wireless microphone) and low latency audio. This appliance is a 1U high rack-mountable server with the following specifications: 1 GHz Pentium processor; 256 MB memory; 20 GB hard drive; Red Hat Linux 7.1 operating system; Dual100 Base-T Ethernet NIC; high quality Data/Fax/Voice internal modem; multimedia sound card; and optional wireless microphone and receiving station.

Referring now to FIG. 1, there is shown Scenario "A" in which the broadcast origination point may be the floor of a major securities exchange 100. To initiate the broadcast, the individual providing the audio content dials the telephone number corresponding to a dedicated phone line 102 connected to the system. A modem 106 (with voice capture) answers the call and passes the signal to the encoder 104. The encoder 104, in turn, passes the digitally encoded signal to the server 106 for the distribution of the signal via a streaming server 108 within the local area network (LAN), e.g., an intranet, or via a streaming server 110 over the internet. A player residing in any desktop PC connected to one of the streaming servers, for example, will decode the digital signal and play back the voice data.

Figure 2:
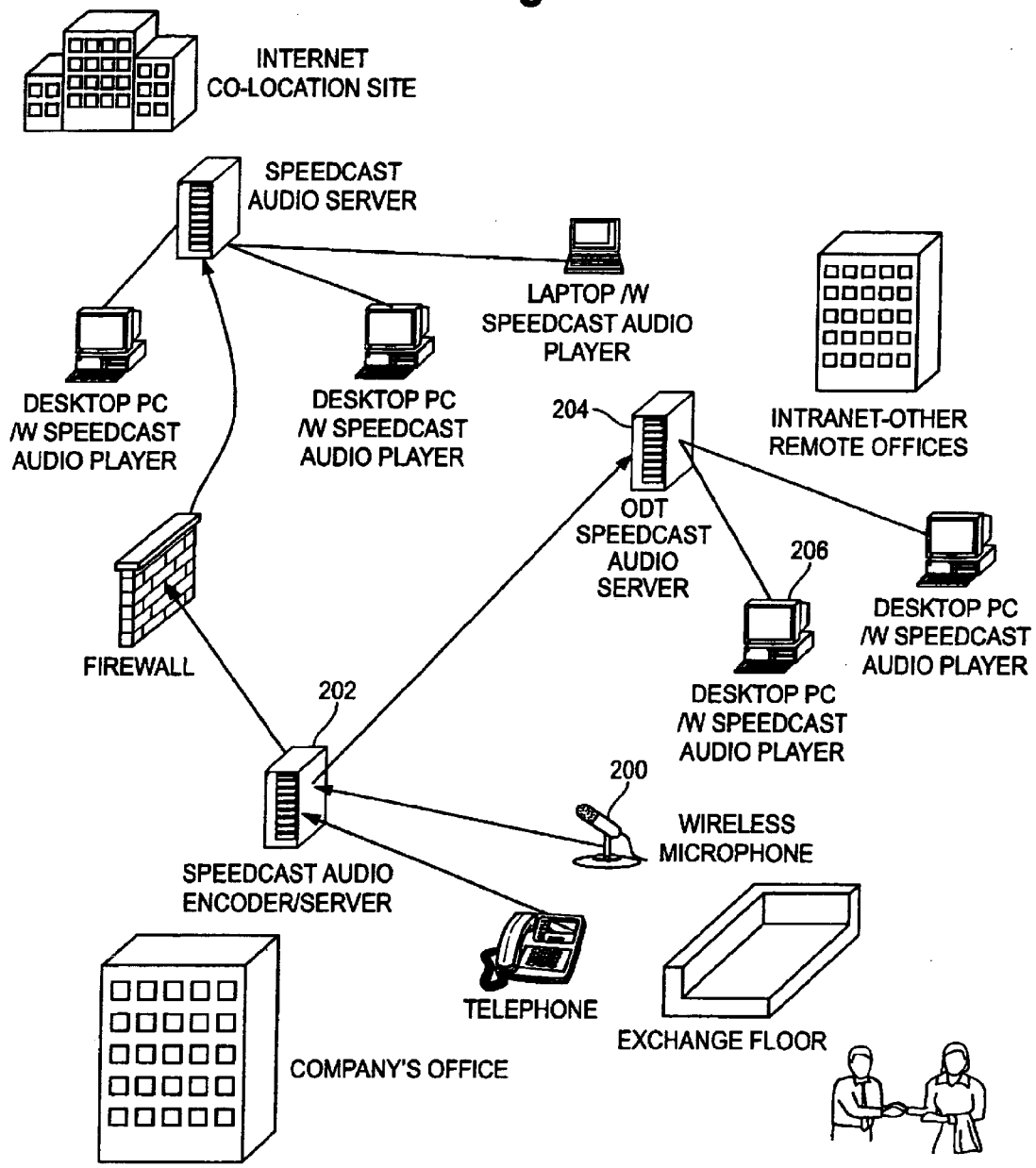
FIG. 2 is a block diagram of another example of a digital audio streaming system with a different configuration.

FIG. 2 illustrates Scenario "B" in which the broadcaster ("squawker") speaks into a wireless microphone 200 linked directly to the server 202 equipped with a wireless station. Encoder/server 202 captures the voice, encodes the audio signals and transmits them to server 204 for distribution. A player residing in any desktop PC, for example PC 206, decodes the digital signal and plays back the voice data. These system concepts can also be applied to video and audio for multimedia systems.

An exemplary embodiment of a multimedia system includes up to about eight (8) logical software subsystems: encoder, slide presenter, whiteboard (collaboration tools), IRC server, reflector, conference server or multipoint control unit (MCU) and player. An optional conference gateway can handle packet-level translation of H.323 and session initiation protocol (SIP) based conferencing to make the SpeedCast Video system interoperable with these types of systems.

The encoding station is responsible for encoding the video/audio channels, packetizing audio/video channels, and transmitting the packetized streams to a reflector. The slide presenter provides a series of static images, such as joint photographic exerts group (JPEG) or portable network graphic (PNG) format, that are generated using MS PowerPoint. This is part of the logically independent data channel. Therefore, other data channels such as a spreadsheet, Word file and the like can be channeled through accordingly. Internet Relay Chat (IRC) handles standard chat functions. It consists of an IRC server residing on the conference server or reflectors and IRC client residing on every desktop computer where a player runs.

The reflector distributes streams that are received (video, audio, data, chat session and control channels) within its video conferencing group. Depending on the availability of multicasting network, the reflector may either multicast or unicast the received streams. Each reflector acts as a proxy server for its video conferencing subgroup. The player decodes and plays-back audio and video stream(s). It also processes and displays IRC messages (send and receive windows), PowerPoint images, whiteboard image(s), and the like.

The conference server receives all the encoded audio/video streams, reconstructs them to a single frame, and transmits them to all the players within the video conferencing group via the reflectors. In addition, it handles all the conference management, session management, user administration (authentication, joining, leaving of video conferencing) and collaboration tasks.

These software subsystems may be hosted in four (4) classes of computers (preferably Intel PCs): a first player station, which may be a Windows PC running player, and IRC client; a second encoding station for running the encoder, the presenter server and the whiteboard server; a reflector or server, which may be a Linux-based multimedia streaming server housing a reflector which acts as a transmission control protocol (TCP) and RTP splitter and a proxy server, as well as a multicast repeater, and which may also host an IRC server; and an optional video conferencing server, which may be a Linux-based server housing conference management software and an IRC server, other H.323 or SIP enabled devices being connected via a conference gateway.

Figure 3:
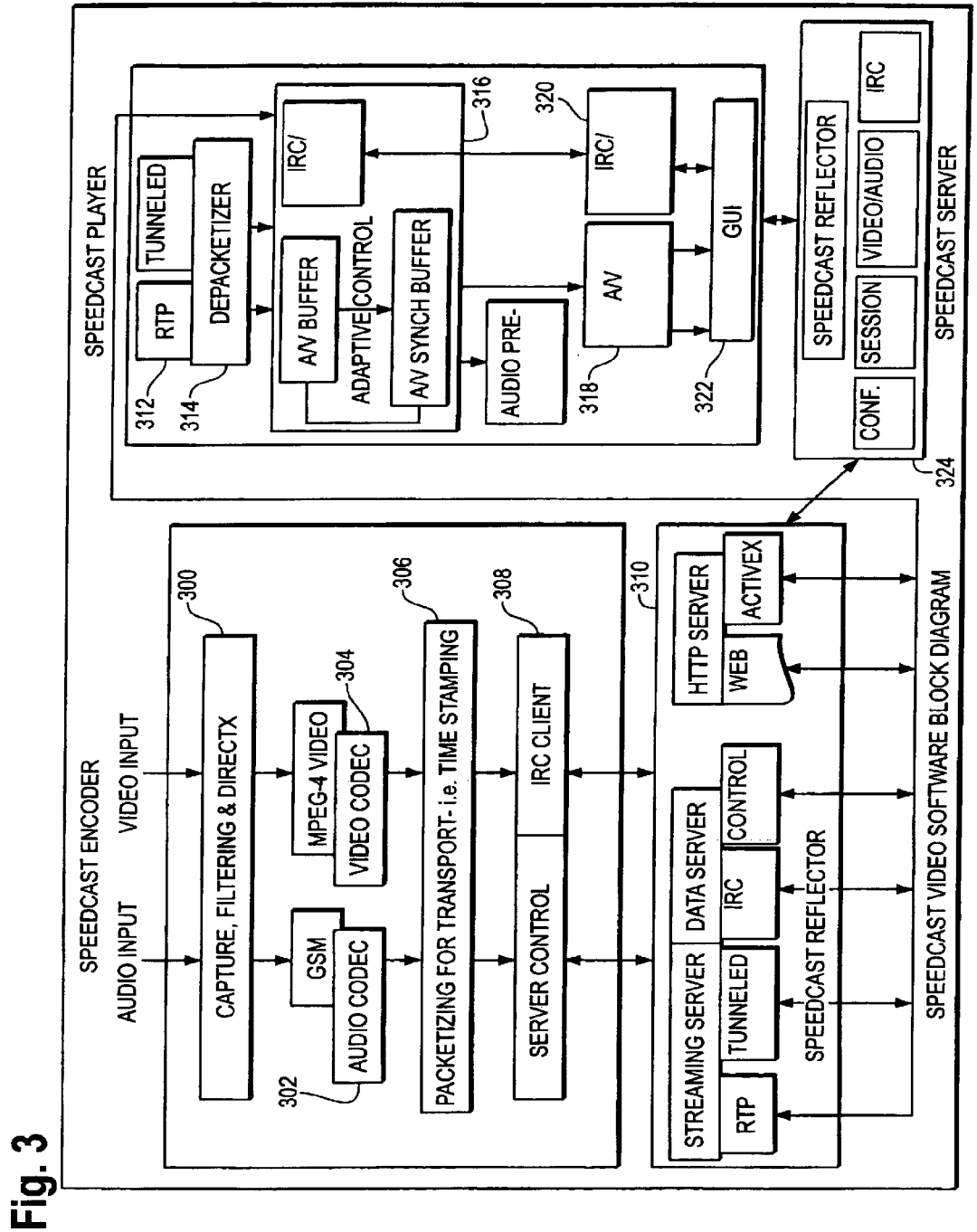
FIG. 3 is a software block diagram of SpeedCast Video digital multimedia streaming system.

FIG. 3 is a software block diagram of the SpeedCast Video system. Currently, the SpeedCast Encoder and Speed Cast Player are designed for MS Windows. The SpeedCast conference server, IRC server and reflector are designed for Linux.

A capture, filtering, and DirectX module 300 has audio and video inputs, and has outputs to an audio code 302 and a video code 304. A packetizing module 306 is operatively connected to the audio code 302 and the video code 304. Server control 308 and IRC client 310 interface the packetizing module 306 to a server 310.

The server 310 communicates with a client 312. The client 312 has a depacketizing module 314, an adaptive control module 316, an audio/video decoder 318, and an IRC control client 320. An interface module 322 operatively connects the client 312 to a reflector 324.

Depending on the specific application, the system can be configured in many different ways. The following are exemplary configurations for different applications.

Figure 4:
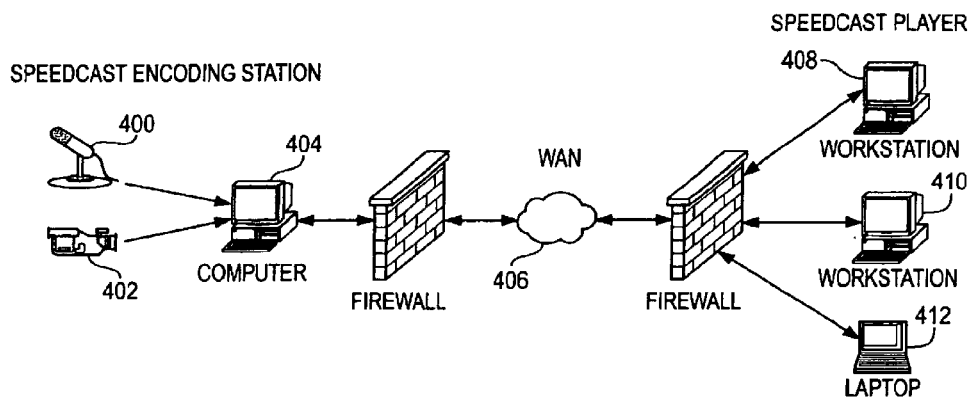
FIG. 4 is a block diagram of another example of a digital multimedia streaming system.

FIG. 4 illustrates Case 1, which is an example of a corporate communications system for a small group. One server computer is used to run all the server applications. Audio component 400 and video component 402 are operatively connected to the server computer 404. The server computer 404 communicates via a wide area network 406 with players, work stations 408, 410, and laptop 412.

Figure 5:
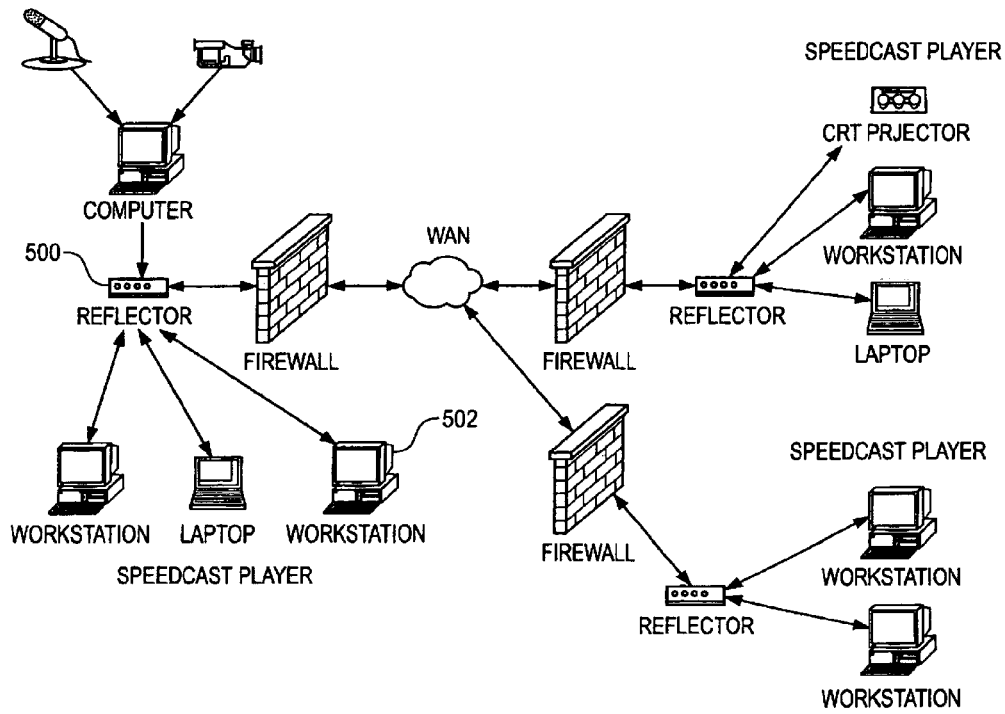
FIG. 5 is a block diagram of another example of a digital multimedia streaming system.

FIG. 5 illustrates Case 2 which is an example of a corporate communications or E-learning system for a large group of users. Each office may have a reflector 500, which can serve up to six hundred (600) unicast (TCP or RTP) clients (for example workstation 502) using up to 300 Kbps. For multicast networking, each receiving reflector may receive one unicast stream and route it as multicast packets within its multicast-enabled LAN.

Figure 6:
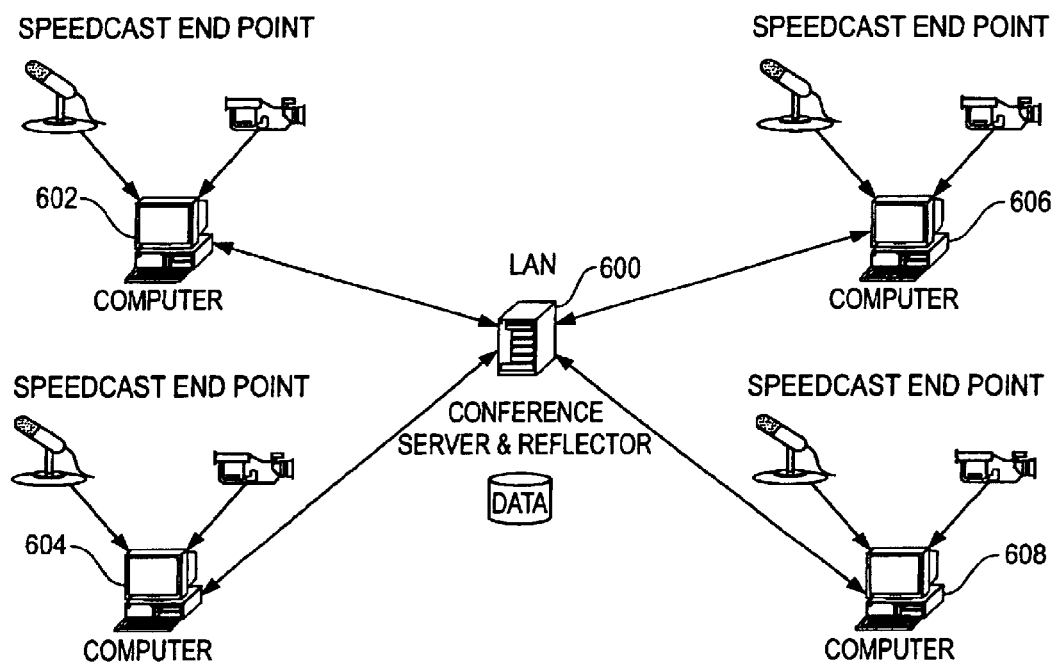
FIG. 6 is a block diagram of an example of a bi-directional (multipoint 2-way) digital multimedia streaming system.

Case 3 is illustrated in FIG. 6 and is exemplary of a small-scale video conferencing system within a LAN to, for example, provide bidirectional exchange of real-time media data between computers via the LAN. A SpeedCast reflector and conference server 600 may reside in a single Intel box. The reflector and conference server 600 interconnects computers 602, 604, 606 and 608. Those skilled in the art will recognize that the same principles can be used to provide bi-directional exchange of real-time media data between computers via the internet.

Figure 7:
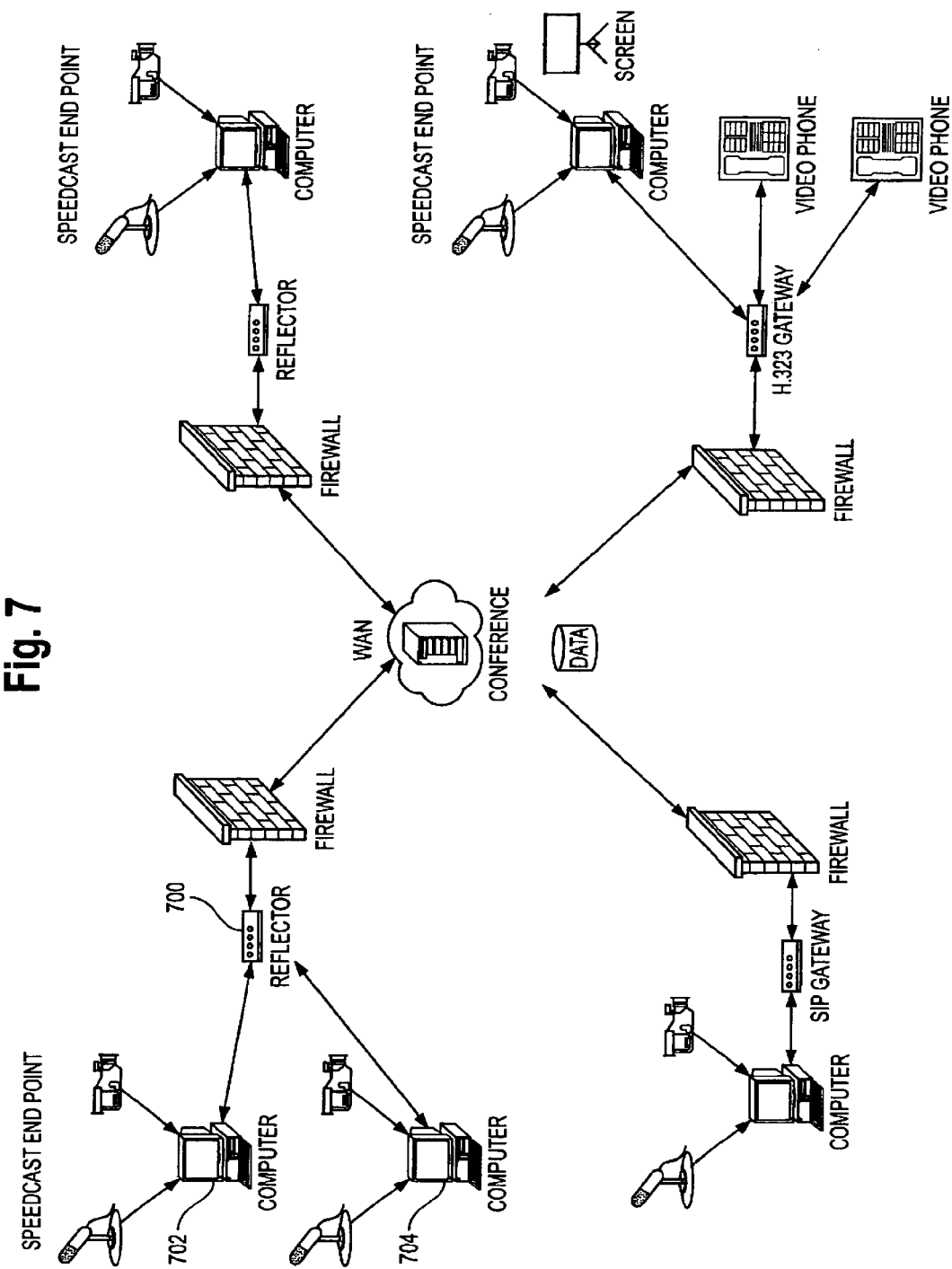
FIG. 7 is a block diagram of another example of a bi-directional (multipoint 2-way) digital multimedia streaming system.

FIG. 7 illustrates Case 4, which is exemplary of a corporate video conferencing system with several remote offices participating. Each office may have a reflector (700, for example) to distribute incoming and outgoing video conferencing streams (to computers 702, 704, for example). The SpeedCast player, implemented as ActiveX controls, is designed to run on a Windows PC requiring only a browser (currently IE 6.0 or higher). It requires users to login to the conference server before users can participate in video conferencing. The SpeedCast user interface can include live video window(s), IRC session window, slide presenter window and whiteboard window. The following examples demonstrate typical usage.

Figure 8:
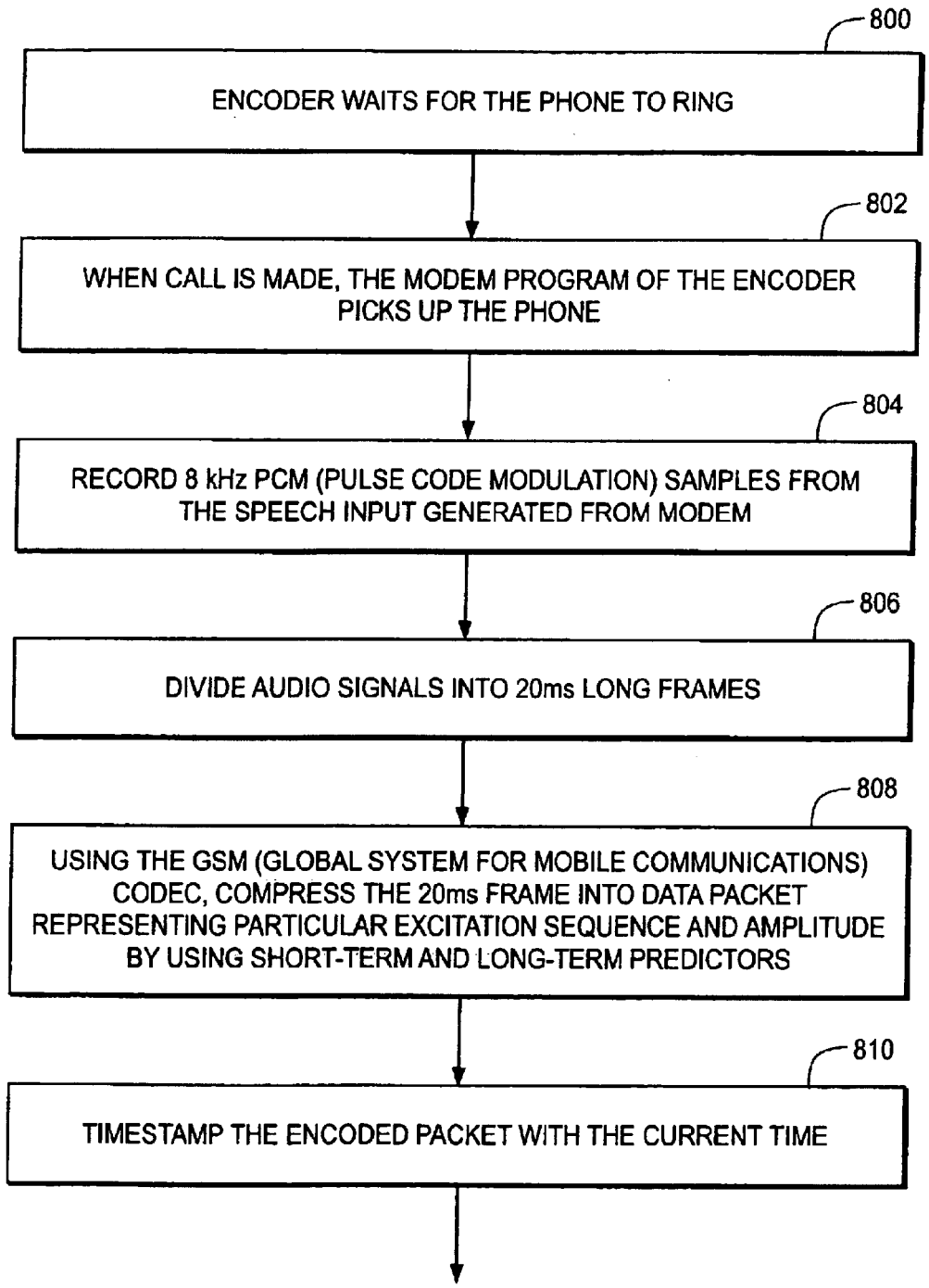
FIG. 8 is a flowchart depicting one embodiment of encoder data flow for SpeedCast Audio system (low-latency audio only system)

FIG. 8 depicts a system and method for SpeedCast Audio Encoder data flow. The following steps are shown: encoder waits for the phone to ring (step 800); when a call is made, the modem software of the encoder picks up the phone (step 802); record 8 kHz PCM (Pulse Code Modulation) samples from the speech input generated from modem (step 804); divide audio signals into 20 ms long frames (step 806); using the GSM code, compress the 20 ms frame into data packets representing particular excitation sequence and amplitude by using short-term and long-term predictors (step 808); and time-stamp the encoded packet with the current time (step 810).

Figure 9:
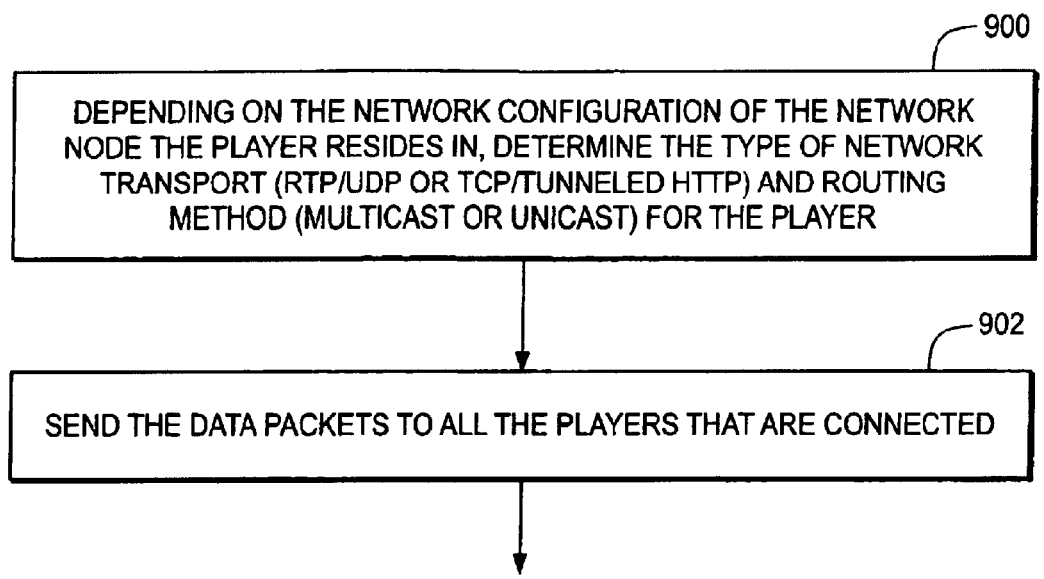
FIG. 9 is a flowchart depicting one embodiment of server data flow for SpeedCast Audio system.

FIG. 9 illustrates a system and method for SpeedCast Audio Server data flow. The following steps are shown: depending on the network configuration of the network node the player resides in, determine the type of network transport (RTP/UDP or TCP/Tunneled HTTP) and routing method (multicast or unicast) for the player (step 900); and send the data packets to all the players that are connected (step 902).

Figure 10:
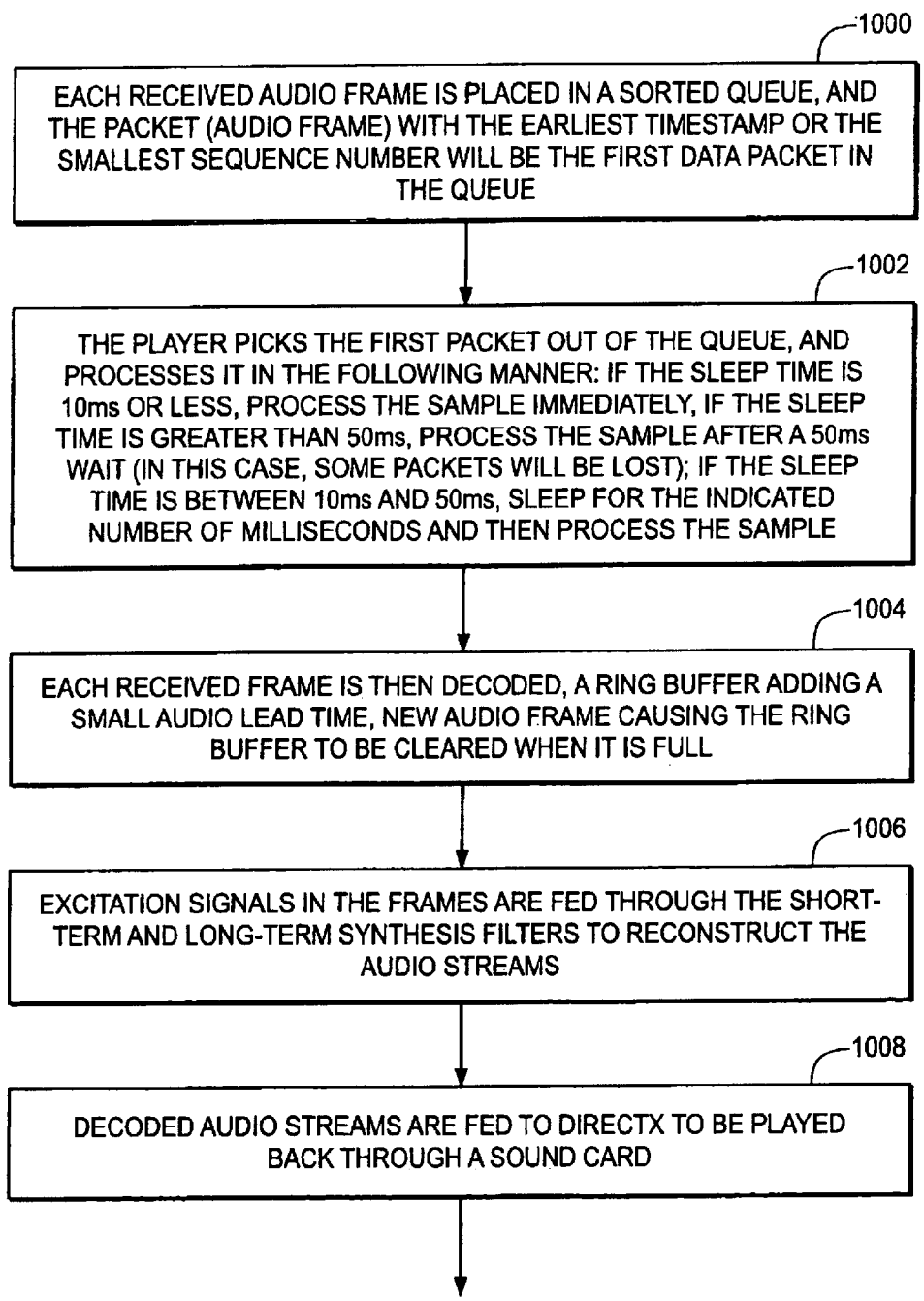
FIG. 10 is a flowchart depicting one embodiment of player data flow for SpeedCast Audio system.

FIG. 10 illustrates a system and method for SpeedCast Audio Player data flow. The following steps are shown: each received audio frame is placed in a sorted queue, and the packet (audio frame) with the earliest time-stamp or the smallest sequence number is the first data packet in the queue (step 1000); the player picks the first packet out of the queue, and processes it in the following manner: if the sleep time is 10 ms or less, process the sample immediately, if the sleep time is greater than 50 ms, process the sample after a 50 ms wait (in this case, some packets will be lost); if the sleep time is between 10 ms and 50 ms, sleep for the indicated number of milliseconds and then process the sample (step 1002); each received frame is then decoded, a ring buffer adding a small audio lead time, new audio frame causing the ring buffer to be cleared when it is full (step 1004); excitation signals in the frames are fed through the short-term and long-term synthesis filters to reconstruct the audio streams (step 1006); and decoded audio streams are fed to DirectX to be played back through a sound card (step 1008).

Figure 11:
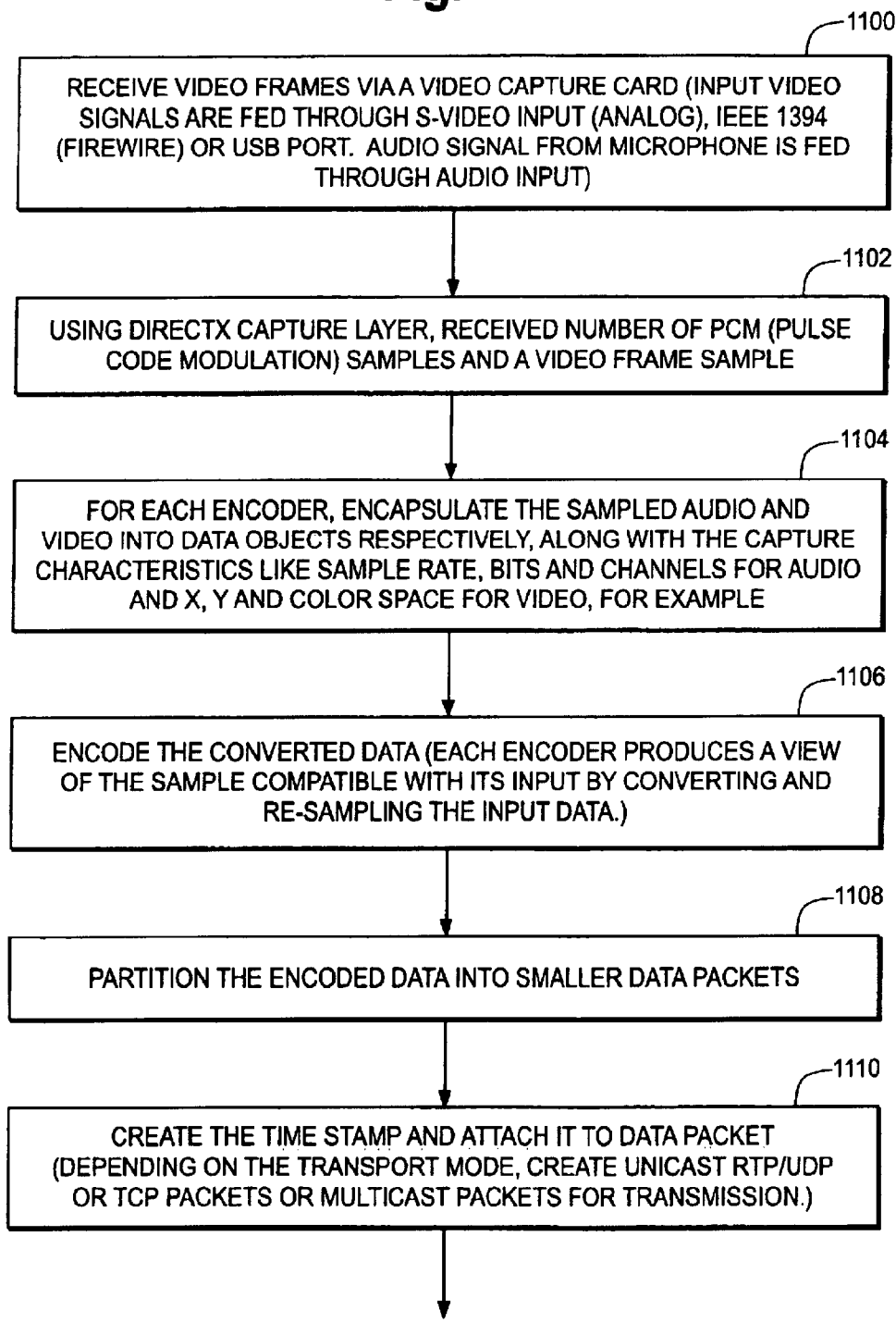
FIG. 11 is a flowchart depicting one embodiment of encoder data flow for SpeedCast Video system (low latency audio and video system)

FIG. 11 illustrates a system and method for video/audio encoder data flow. The following steps are shown: receive video frames via a video capture card (input video signals are fed through S-Video input (analog), IEEE 1394 (firewire) or USB port) and receive audio signals from a microphone that are fed through an audio input (step 1100); using DirectX capture layer, receive number of Pulse Code Modulation (PCM) samples and a video frame sample (step 1102); for each encoder, encapsulate the sampled audio and video into data objects respectively, along with the capture characteristics such as sample rate, bits and channels for audio and x, y and color space for video (step 1104); encode the converted data by producing a stream of data compatible with its input by converting and re-sampling the input data (step 1106); partition the encoded data into smaller data packets (step 1108); and create the time-stamp and attach time-stamp to data packet. Depending on the transport mode, create unicast RTP/UDP or TCP packets or multicast packets for transmission (step 1110).

Figure 12:
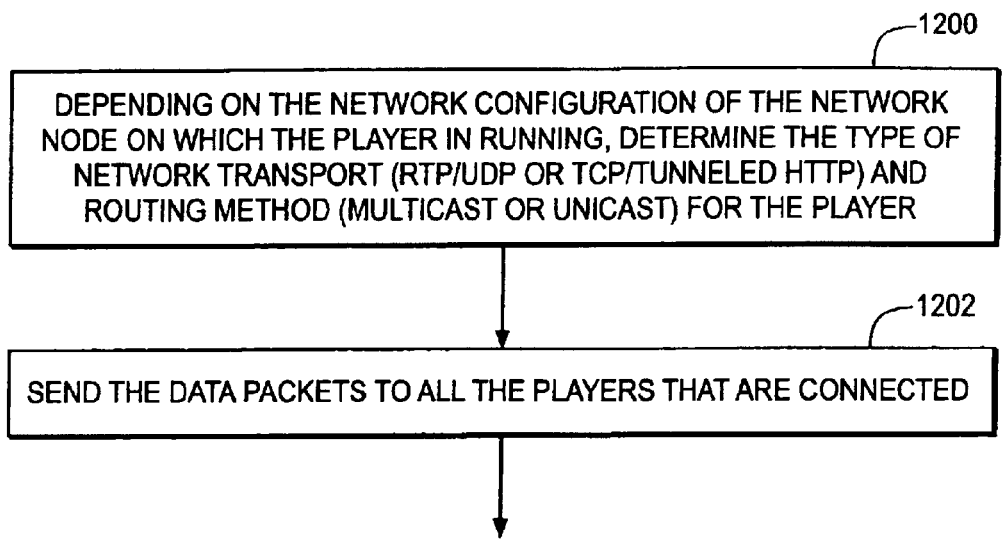
FIG. 12 is a flowchart depicting one embodiment of server data flow for SpeedCast Video system.

FIG. 12 illustrates a system and method for video/audio server data flow. The following steps are shown: depending on the network configuration of the network node on which the player is running, determine the type of network transport (RTP/UDP or TCP/Tunneled HTTP) and routing method (multicast or unicast) for the player (step 1200); and send the data packets to all the players that are connected to the server (step 1202).

Figure 13:
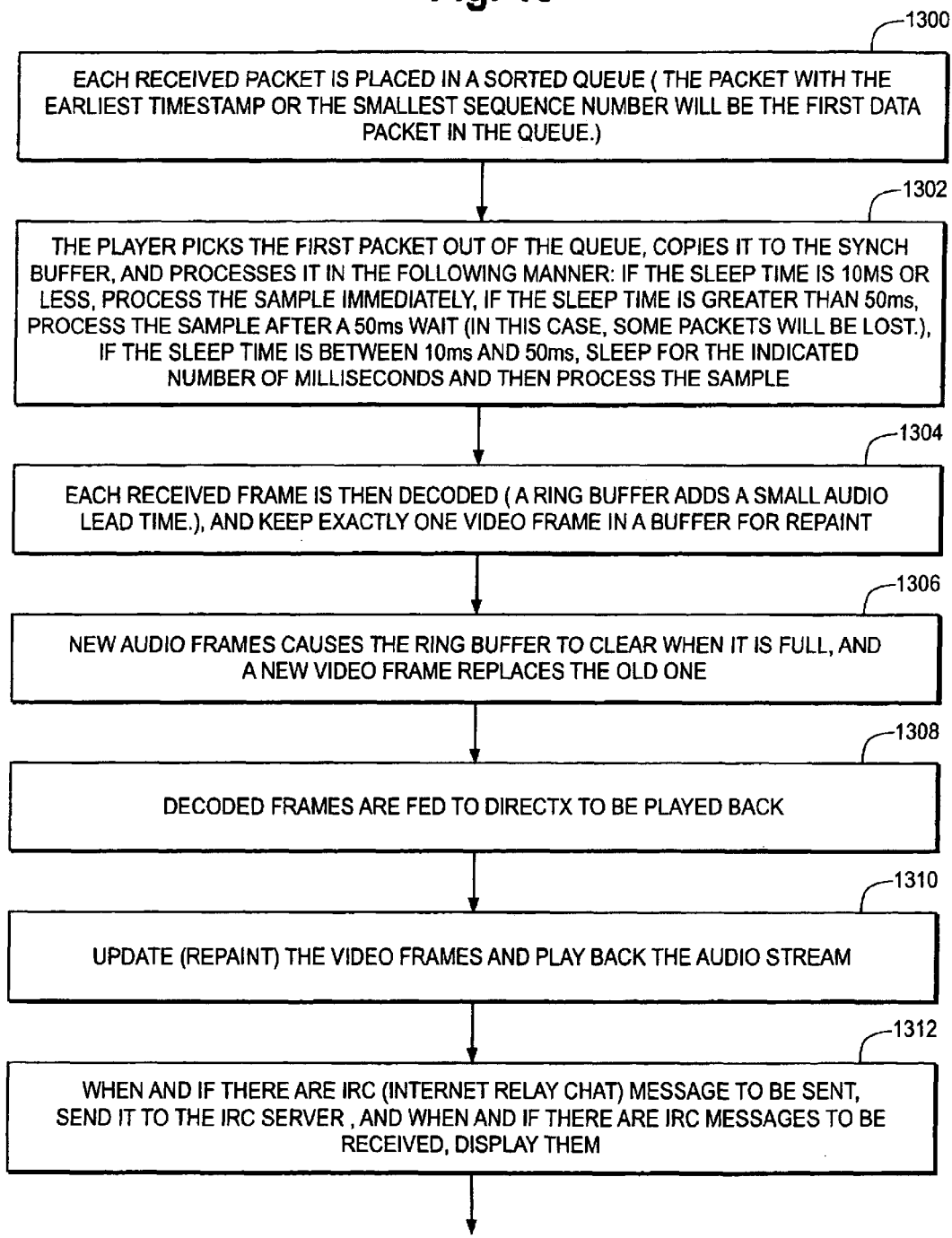
FIG. 13 is a flowchart depicting one embodiment of player data flow for SpeedCast Video system.

FIG. 13 illustrates a system and method for of SpeedCast Video (video/audio) player data flow. The following steps are shown: each received packet is placed in a sorted queue, the packet with the earliest time-stamp or the smallest sequence number is the first data packet in the queue (step 1300); the player picks the first packet out of the queue, copies it to a synch buffer, and processes it in the following manner: if the sleep time is 10 ms or less, process the sample immediately, if the sleep time is greater than 50 ms, process the sample after a 50 ms wait, if the sleep time is between 10 ms and 50 ms, sleep for the indicated number of milliseconds and then process the sample (step 1302); each received frame is then decoded, and keep exactly one video frame in a buffer for a repaint (step 1304); new audio frame causes the ring buffer to clear when it is full, and a new video frame replaces the old one (step 1306); decoded frames are fed to DirectX to be played back (step 1308); update (repaint) the video frames and play back the audio stream (step 1310), and when and if there are IRC messages to be sent, send them to the IRC server, and when and if there are IRC messages received, display them.

The present systems' apparatus overcomes the drawbacks of prior art systems and allow thousands of people to listen to an audio stream simultaneously and economically with very little delay. The typical latency in the audio system is about 500 ms within the pubic internet. No special hardware or media players are required. Any internet ready Windows computer with standard sound card and speaker allows users to listen to the broadcasted audio stream.

For multimedia (audio and video) systems, apparatus and methods, the system operates at under one second latency end-to-end, over the standard internet. Within a LAN, typical delay may be less than 500 ms.

In another embodiment of the invention, the processes described above are extended to cover the two-way exchange of audio, video and instant messaging information between a caller and called party. The process may proceed substantially as described above, with certain exceptions described in more detail below.

Figure 14:
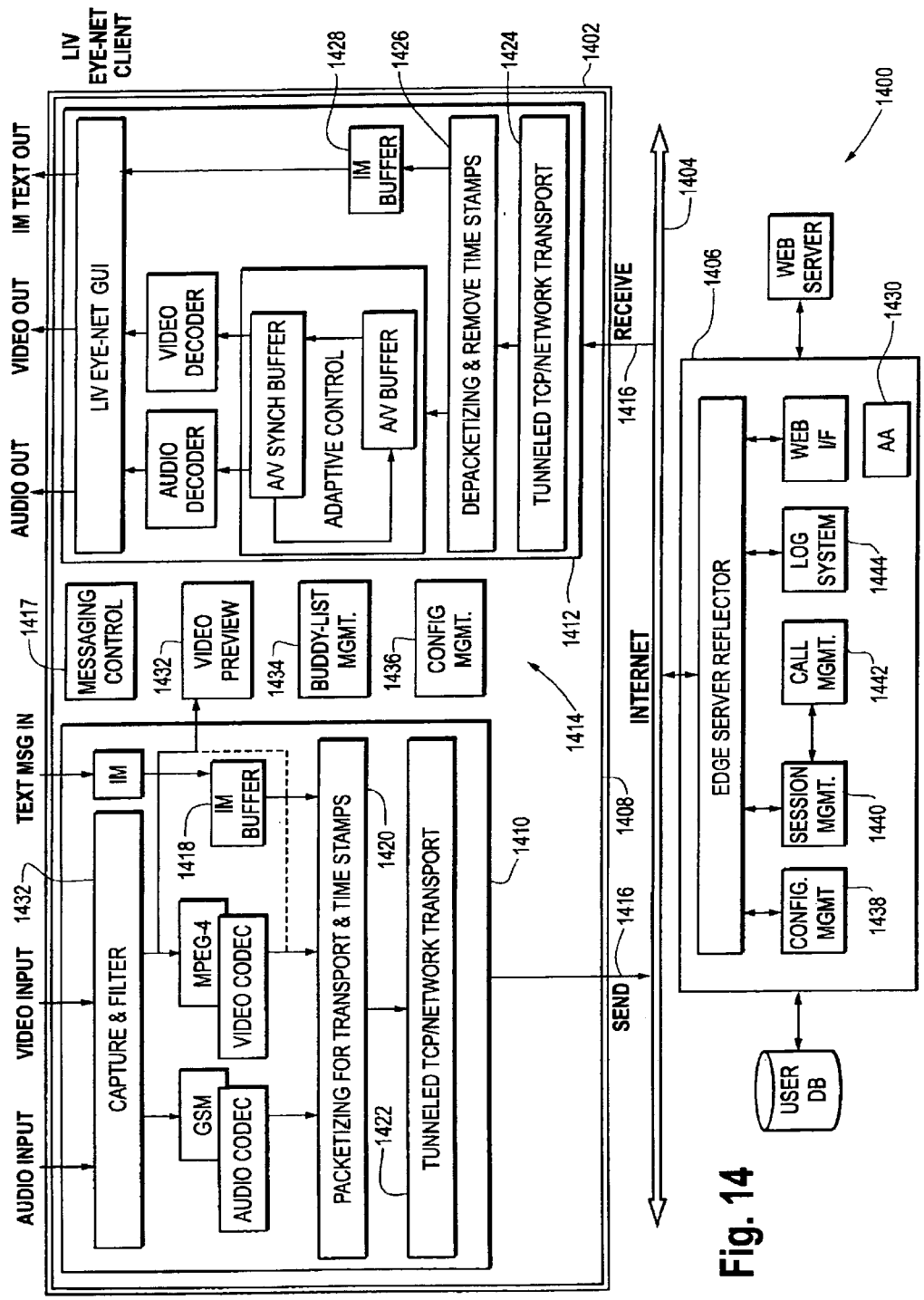
FIG. 14 is a software block diagram of a two-way conferencing system.

FIG. 14 depicts a system 1400 for the exchange of audio, video and instant message information between the caller and called party. Included with the system 1400 may be a personal computer (PC) 1402. It may be noted that even through only one PC 1402 is shown, it would be assumed that the caller and called party each have a PC 1402.

Included within each PC 1402 is a multimedia transceiver 1408 that functions as a communication interface between the Internet and the caller and between the Internet and the called party. The multimedia transceiver 1408 may be made up of a number of Windows programs that provide the functionality discussed below. Included within the multimedia transceiver 1408 may be a multimedia transmitter 1410 and a multimedia receiver 1412. Also included within the multimedia transceiver 1408 may be a session control section 1414.

Figure 15:
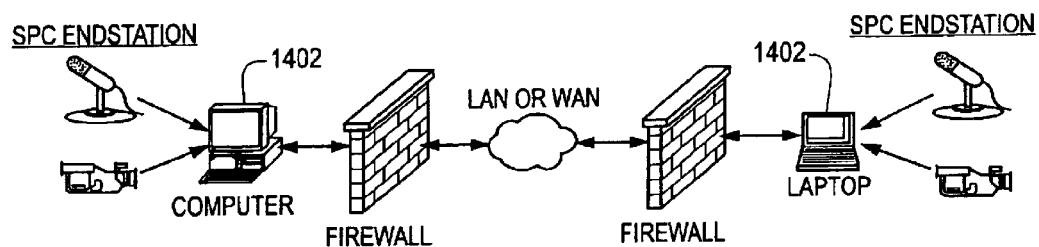
FIG. 15 is a block diagram of a two-way conferencing system using a direct connection method.

The caller's PC 1402 may be coupled to the called party's PC 1402 either directly through the Internet 1404 or through a server 1406. If the PCs 1402 of both caller and called party reside on the same network or if they can exchange Transport Control Protocol (TCP) packets directly, one with the other, then a direct connection (FIG. 15) may be the most efficient route.

Where a direct two-way conference is to be established as shown in FIG. 15, a caller may first enter a username of the called party to initiate a connection. The entry of the username of the called party causes a session control processor 1417 to set up a session link 1416 with the called party using an appropriate tunneled transmission control protocol connection. In this case the session link 1416 may be set up as http on port 80. The use of http on port 80, under this illustrated embodiment, allows audio, video and instant messaging to be exchanged through the session link 1416.

Figure 16:
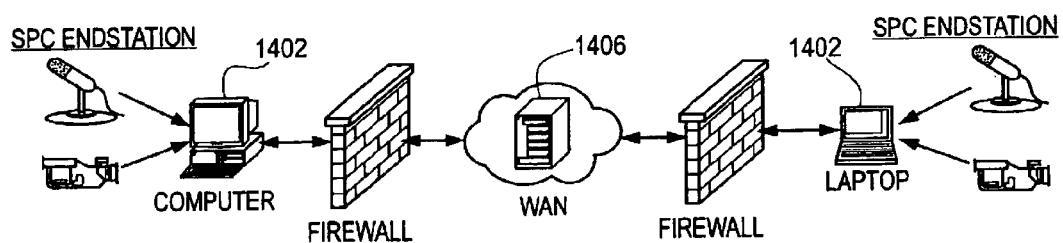
FIG. 16 is a block diagram of a two-way conferencing system using a connection method including a server.

If the endpoints 1402 of the caller and called party cannot send and receive TCP packets directly, one to the other, then a server 1406 acts as a middleman, as shown in FIG. 16. In this case, each party would log into the server 1406 using their respective PC 1402.

Within the server 1406, the identify of each party may be verified using an authentication application 1430. The authentication application 1430 may be based upon any appropriate authentication algorithm (e.g., the Blowfish algorithm, SSHv2, etc).

Figure 17:
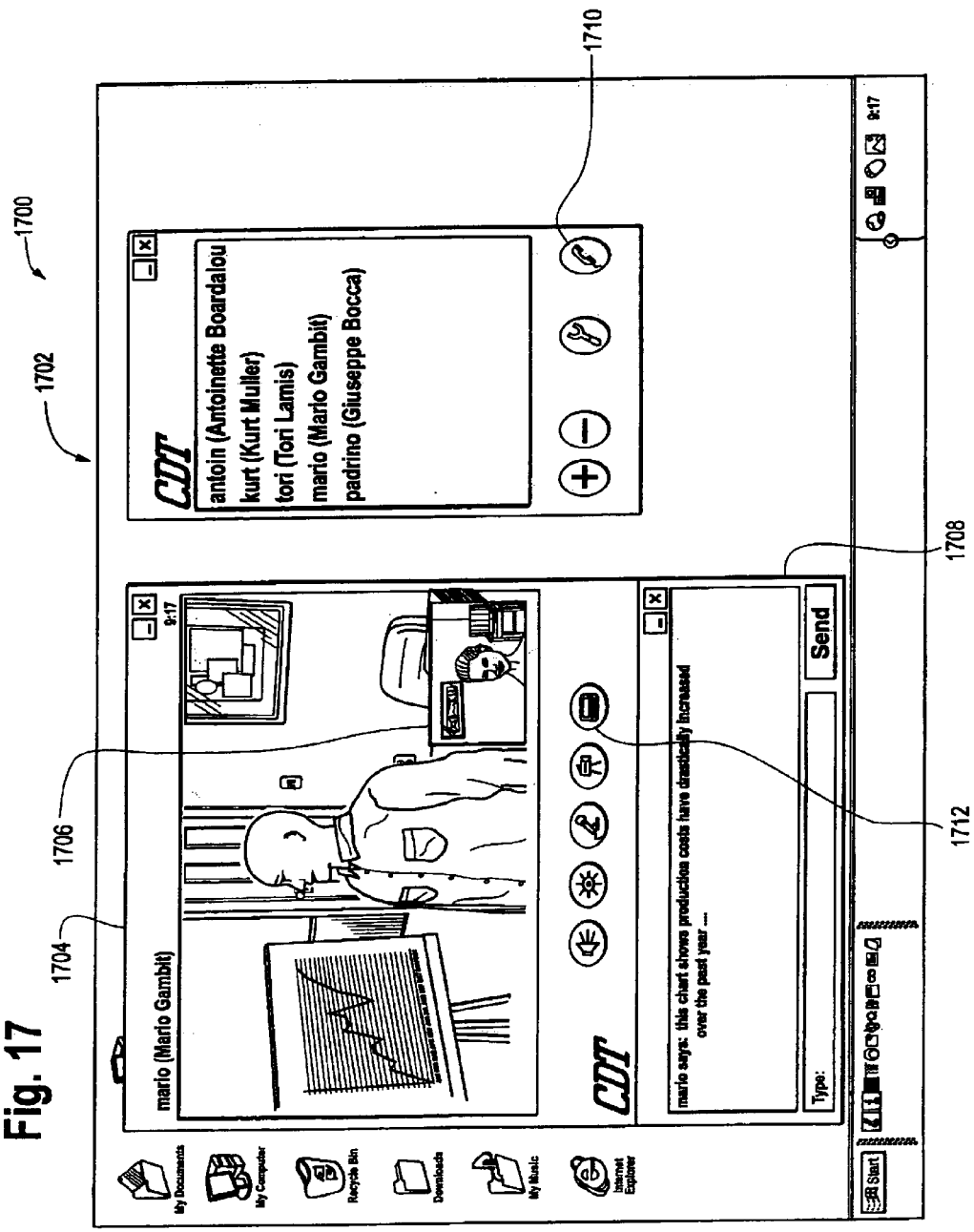
FIG. 17 depicts a graphical user interface screen of a two-way conferencing system.

FIG. 17 shows a two-way conference screen 1700 between a caller and called party under an illustrated embodiment of the invention. As shown, a first window 1704 may be provided by on a first party's terminal 1402 that allows the first party to view the other party. A Picture-in-Picture (PIP) window 1706 may be provided through which the first party may view his own image through a preview feature 1432 provided on the first party's terminal 1402. A further window 1708 may be provided for viewing instant messages.

Once logged in, the parties may set up their respective configuration parameters by transferring certain preferences from their own configuration management files 1436 to the configuration management file 1438 of the server 1406 (e.g., a buddy list).

To make a call, a caller may select a person from a buddy list 1702 (FIG. 17) and activate a call button 1710. Once the call has been requested, a session control processor 1440, 1442 may set up a session link 1416 between the parties. The session link may be set up upon selection of a called party and activation of a make call button after each party logs into the server 1406. The session links may be set up between the server 1406 and each party as described above using an appropriate tunneled transmission control protocol. The session links may be set up as http on port 80. The use of http on port 80, under this illustrated embodiment, allows audio, video and instant messaging to be exchanged through the session link 1416. The server 1406 functions to transfer audio, video and instant messaging from the caller to the called party and visa versa.

Once the session link 1416 has been established (either directly or through the server 1406), the caller and called party may begin to exchange information. In this regard, a caller may type a message in the IM box 1708 and send a typed message by pushing a IM send button 1712 or by simply pressing a return key.

Alternatively, the caller may activate video and audio features via similar buttons. In this regard, a video capture card may begin to supply video frames as described above. Simultaneously, audio information may also be collected as described above via an audio capture card, where both the video and audio cards reside on the PC 1402. Instant messaging (IM) may also be received from existing applications through an IM buffer 1418.

As the audio and video information are received, the information and capture characteristics may be converted by a capture application 1432 into a set of data objects. The audio capture characteristics may include a sample rate, the number of bits in each data word and the number and identifier of each audio channel. Video capture characteristics may include x-position, y-position and a color space.

Once the information has been converted into a set of data objects, the information may be re-sampled and converted into the preferred predetermined format (i.e., GSM and MPEG-4). Resampling and conversion may be used to convert information received under other formats to a common format that is more easily and efficiently handled by the transceiver 1408.

Once the audio and video information has been re-sampled, the re-sampled data may be partitioned into smaller data packets to simplify transmission. For example, video frame information may be partitioned into packets that are more easily processed by downstream processing elements.

Once partitioned into smaller packets, the packetizer 1420 may attach time stamps and sequence numbers to the packets. A time stamp may indicate when a video frame was captured and a sequence number may indicate where in a video frame a data sample came from. Audio, video and instant messaging packets may be separately identified through indicia that are attached to the respective packets. The packet identifiers, time stamps, sequence number and data may be incorporated by a network transport layer 1422 into real time packets using TCP. In general, each real time packet may include information that is encoded under an audio, video or IM format.

The real time packets may be exchanged between the caller and called party through the session link 1416. At this point, the type of information exchanged (i.e., audio, video, IM) is transparent to the session link 1416.

Once received, the real time packets may be processed in reverse order. First, the audio, video and instant messaging packets may be segregated into a respective queue by function (i.e., audio, video, IM). Next, the queued packets in each queue may be sorted (i.e., ordered) by timestamp and sequence number.

The earliest packet may be selected out of the queue and copied into a synch buffer. Processing of the packet may be based upon a sleep time. Sleep time may be used to allow more data to accumulate before processing is initiated to allow for smoother processing. For example, if a sleep time is 10 ms, then the packet is processed immediately. If the sleep time is 50 ms, then the packet is processed after 50 ms. If the sleep time is somewhere between 10 and 50 ms, then the packet is processed after the specified sleep time.

Video information may be loaded into a ring buffer. The use of a ring buffer allows the video image on the user screen to be periodically refreshed (repainted). The use of a ring buffer also provides a mechanism by which a small audio lead time may be introduced between audio and video that was originally collected concurrently.

As each new video frame is received, the new video frame may be loaded and reconstructed within the synch buffer. Once the new video frame is complete (and correlated to an audio frame), the new video frame may be loaded into the ring buffer, thereby replacing the previous video frame. Once the video and audio information are decoded, the decoded frames may be sent to the DirectX application for playback within the respective window 1704 and speaker.

In a similar manner, instant messages may also be processed. As instant messages are received, they are displayed in the IM window 1708.

It is to be understood, of course, that the present invention in various embodiments can be implemented in hardware, software, or in combinations thereof. In the present disclosure, the words "a" or "an" are to be taken to include both the singular and the plural. Conversely, any reference to plural items shall, where appropriate, include the singular.

All patents referred to herein, are hereby incorporated herein by reference, whether or not specifically done so within the text of this disclosure.

The invention is not limited to the particular details of the apparatus and method depicted, and other modifications and applications are contemplated. Certain other changes may be made in the above-described apparatus and method without departing from the true spirit and scope of the invention herein involved. It is intended, therefore, that the subject matter in the above depiction shall be interpreted as illustrative, and not in a limiting sense.

What is claimed is:

1. A method of exchanging audio/visual information between a caller and a called party through the Internet, such method comprising the steps of:

the caller connecting to a server;

the server authenticating an identity of the caller using a server authentication program;

the server setting up a session link between the caller and called party using a transport control protocol and a tunneled real time control protocol;

sending a access request from the caller to the called party under the tunneled real time protocol;

collecting audio and video information from the caller and called party by receiving video frame information via a video capture card and substantially simultaneously receiving audio information via an audio input, both residing on a personal computer of respective caller and called party;

re-sampling the audio and video information to obtain packets of a predetermined data format;

partitioning the packets into smaller data packets;

forming the audio and video portions into data objects incorporating capture characteristics of the audio and video information;

attaching a time stamp to each formed data object;

the caller and called party transmitting and receiving audio and video information by exchanging the formed audio and video data objects as real time packets using the transport control protocol between the caller and called party through the session link;

the caller and called party ordering each received packet based upon timestamp and then by smallest relative sequence number; and the caller and called party copying a first packet of the ordered packets into a synch buffer and processing the first packet, wherein the step of processing the first packet further comprises determining a sleep time and if the sleep time is less than 10 milliseconds, processing the first packet immediately.

2. A method of exchanging audio/visual information between a caller and a called party through the Internet, such method comprising the steps of:

the caller connecting to a server;

the server authenticating an identity of the caller using a server authentication program;

the server setting up a session link between the caller and called party using a transport control protocol and a tunneled real time control protocol;

sending a access request from the caller to the called party under the tunneled real time protocol;

collecting audio and video information from the caller and called party by receiving video frame information via a video capture card and substantially simultaneously receiving audio information via an audio input, both residing on a personal computer of respective caller and called party;

re-sampling the audio and video information to obtain packets of a predetermined data format;

partitioning the packets into smaller data packets;

forming the audio and video portions into data objects incorporating capture characteristics of the audio and video information;

attaching a time stamp to each formed data object;

the caller and called party transmitting and receiving audio and video information by exchanging the formed audio and video data objects as real time packets using the transport control protocol between the caller and called party through the session link;

the caller and called party ordering each received packet based upon timestamp and then by smallest relative sequence number; and the caller and called party copying a first packet of the ordered packets into a synch buffer and processing the first packet, wherein the step of processing the first packet further comprises determining a sleep time and if the sleep time is greater than 50 milliseconds, processing the first packet after a 50 millisecond wait.

3. A method of exchanging audio/visual information between a caller and a called party through the Internet, such method comprising the steps of:

the caller connecting to a server;

the server authenticating an identity of the caller using a server authentication program;

the server setting up a session link between the caller and called party using a transport control protocol and a tunneled real time control protocol;

sending a access request from the caller to the called party under the tunneled real time protocol;

collecting audio and video information from the caller and called party by receiving video frame information via a video capture card arid substantially simultaneously receiving audio information via an audio input, both residing on a personal computer of respective caller and called party;

re-sampling the audio and video information to obtain packets of a predetermined data format;

partitioning the packets into smaller data packets;

forming the audio and video portions into data objects incorporating capture characteristics of the audio and video information;

attaching a time stamp to each formed data object;

the caller and called party transmitting and receiving audio and video information by exchanging the formed audio and video data objects as real time packets using the transport control protocol between the caller and called party through the session link;

the caller and called party ordering each received packet based upon timestamp and then by smallest relative sequence number; and the caller and called party copying a first packet of the ordered packets into a synch buffer and processing the first packet, wherein the step of processing the first packet further comprises determining a sleep time and if the sleep time is between 10 and 50 milliseconds, then sleeping for a predetermined number of milliseconds and then processing the first packet.

4. A method of exchanging audio/visual information between a caller and a called party through the Internet, such method comprising the steps of:

the caller connecting to a server;

the server authenticating an identity of the caller using a server authentication program;

the server setting up a session link between the caller and called party using a transport control protocol and a tunneled real time control protocol;

sending a access request from the caller to the called party under the tunneled real time protocol;

collecting audio and video information from the caller and called party by receiving video frame information via a video capture card and substantially simultaneously receiving audio information via an audio input, both residing on a personal computer of respective caller and called party;

re-sampling the audio and video information to obtain packets of a predetermined data format;

partitioning the packets into smaller data packets;

forming the audio and video portions into data objects incorporating capture characteristics of the audio and video information;

attaching a time stamp to each formed data object;

the caller and called party transmitting and receiving audio and video information by exchanging the formed audio and video data objects as real time packets using the transport control protocol between the caller and called party through the session link;

the caller and called party ordering each received packet based upon timestamp and then by smallest relative sequence number;

the caller and called party copying a first packet of the ordered packets into a synch buffer and processing the first packet;

decoding each received frame;

adding via a ring buffer a relatively small audio lead time; and keeping one video frame in the ring buffer for a repaint of a displayed video image.

5. The method of exchanging audio/visual information as in claim 4 further comprising clearing the ring buffer in response to detection of a new audio frame, a new video frame replacing a previous video frame.

6. The method of exchanging audio/visual information as in claim 5 further comprising feeding decoded frames to a DirectX application to be played back.

7. The method of exchanging audio/visual information as in claim 6 further comprising updating the video frames and playing back the audio stream.

8. The method of exchanging audio/visual information as in claim 7 further comprising sending an instant message, when there is an instant message text to be sent to the server, and, when there are instant messages received, displaying the instant message.

9. An apparatus for exchanging audio/visual information between a caller and a called party through the Internet, such apparatus comprising:

means for connecting the caller to a server and setting up a session link between the caller and called party using a transport control protocol and a tunneled real time control protocol;

means for authenticating an identify of the caller using a server authentication program;

means for sending an access request from the caller to the called party under the tunneled real time protocol;

means for collecting audio and video information from the caller and called party by receiving video frame information via a video capture card and substantially simultaneously receiving audio information via an audio input, both residing on a personal computer of respective caller and called party;

means for re-sampling the audio and video information to obtain packets of a predetermined data format;

means for partitioning the packets into smaller data packets;

means for forming the audio and video portions into data objects incorporating capture characteristics of the audio and video information, wherein the incorporated capture characteristics of the audio information includes at least one of the group consisting of sample rate, bit length of each sample, and a channel number and the incorporated capture characteristics of the video information includes at least one of the group consisting of x position, y position and color space;

means for attaching a time stamp to each formed data object;

means for transmitting and receiving audio and video information by exchanging the formed audio and video data objects as real time packets using a transport control protocol between the caller and called party through the session link;

means for ordering each packet received by the caller and called party based upon a timestamp and then by smallest relative sequence number; and means for copying a first packet of the ordered packets into a synch buffer and processing the first packet, wherein the means for processing the first packet further comprises means for determining a sleep time and if the sleep time is less than 10 milliseconds, processing the first packet immediately.

10. An apparatus for exchanging audio/visual information between a caller and a called party through the Internet, such apparatus comprising:

means for connecting the caller to a server and setting up a session link between the caller and called party using a transport control protocol and a tunneled real time control protocol;

means for authenticating an identify of the caller using a server authentication program;

means for sending an access request from the caller to the called party under the tunneled real time protocol;

means for collecting audio and video information from the caller and called party by receiving video frame information via a video capture card and substantially simultaneously receiving audio information via an audio input, both residing on a personal computer of respective caller and called party;

means for re-sampling the audio and video information to obtain packets of a predetermined data format;

means for partitioning the packets into smaller data packets;

means for forming the audio and video portions into data objects incorporating capture characteristics of the audio and video information, wherein the incorporated capture characteristics of the audio information includes at least one of the group consisting of sample rate, bit length of each sample, and a channel number and the incorporated capture characteristics of the video information includes at least one of the group consisting of x position, y position and color space;

means for attaching a time stamp to each formed data object;

means for transmitting and receiving audio and video information by exchanging the formed audio and video data objects as real time packets using the transport control protocol between the caller and called party through the session link;

means for ordering each packet received by the caller and called party based upon a timestamp and then by smallest relative sequence number; and means for copying a first packet of the ordered packets into a synch buffer and processing the first packet and wherein the means for processing the first packet further comprises means for determining a sleep time and if the sleep time is greater than 50 milliseconds, processing the first packet after a 50 millisecond wait.

11. An apparatus for exchanging audio/visual information between a caller and a called party through the Internet, such apparatus comprising:

means for connecting the caller to a server and setting up a session link between the caller and called party using a transport control protocol and a tunneled real time control protocol;

means for authenticating an identify of the caller using a server authentication program;

means f or sending an access request from the caller to the called party under the tunneled real time protocol;

means for collecting audio and video information from the caller and called party by receiving video frame information via a video capture card and substantially simultaneously receiving audio information via an audio input, both residing on a personal computer of respective caller and called party;

means for re-sampling the audio and video information to obtain packets of a predetermined data format;

means for partitioning the packets into smaller data packets;

means for forming the audio and video portions into data objects incorporating capture characteristics of the audio and video information, wherein the incorporated capture characteristics of the audio information includes at least one of the group consisting of sample rate, bit length of each sample, and a channel number and the incorporated capture characteristics of the video information includes at least one of the group consisting of x position, y position and color space;

means far attaching a time stamp to each formed data object;

means for transmitting and receiving audio and video information by exchanging the formed audio and video data objects as real time packets using the transport control protocol between the caller and called party through the session link;

means for ordering each packet received by the caller and called party based upon a timestamp and then by smallest relative sequence number; and means for copying a first packet of the ordered packets into a synch buffer and processing the first packet, wherein the means for processing the first packet further comprises means for determining a sleep time and if the sleep time is between 10 and 50 milliseconds, then sleeping for a predetermined number of milliseconds and then processing the first packet.

12. An apparatus for exchanging audio/visual information between a caller and a called party through the Internet, such apparatus comprising:

means for connecting the caller to a server and setting up a session link between the caller and called party using a transport control protocol and a tunneled real time control protocol;

means for authenticating an identify of the caller using a server authentication program;

means for sending an access request from the caller to the called party under the tunneled real time protocol;

means for collecting audio and video information from the caller and called party by receiving video frame information via a video capture card and substantially simultaneously receiving audio information via an audio input, both residing on a personal computer of respective caller and called party;

means for re-sampling the audio and video information to obtain packets of a predetermined data format;

means for partitioning the packets into smaller data packets;

means for forming the audio and video portions into data objects incorporating capture characteristics of the audio and video information, wherein the incorporated capture characteristics of the audio information includes at least one of the group consisting of sample rate, bit length of each sample, and a channel number and the incorporated capture characteristics of the video information includes at least one of the group consisting of x position, y position and color space;

means for attaching a time stamp to each formed data object;

means for transmitting and receiving audio and video information by exchanging the formed audio and video data objects as real time packets using the transport control protocol between the caller and called party through the session link;

means for ordering each packet received by the caller and called party based upon a timestamp and then by smallest relative sequence number;

means for copying a first packet of the ordered packets into a synch buffer and processing the first packet; and means for decoding each received frame from the ordered packets, adding via a ring buffer a relatively small audio lead time, and keeping one video frame in the ring buffer for a repaint of a displayed video image.

13. The apparatus for exchanging audio/visual information as in claim 12 further comprising means for clearing the ring buffer in response to detection of a new audio frame, a new video frame replacing a previous video frame.

14. The apparatus for exchanging audio/visual information as in claim 13 further comprising means for feeding decoded frames to a DirectX application to be played back.

15. The apparatus for exchanging audio/visual information as in claim 14 further comprising means for updating the video frames and playing back the audio stream.

16. The apparatus for exchanging audio/visual information as in claim 15 further comprising means for sending an instant message, when there is an instant message text to be sent to the server, and , when there are instant messages received, displaying the instant message.

* * * * *